United States Patent Office 3,098,871
Patented July 23, 1963

3,098,871
PREPARATION OF CYCLIC PHOSPHONITRILES
Irving I. Bezman, Pittsburgh, Pa., assignor to Armstrong Cork Company, Lancaster, Pa., a corporation of Pennsylvania
No Drawing. Filed June 16, 1961, Ser. No. 117,519
8 Claims. (Cl. 260—551)

This invention relates to an improved method for the preparation of a mixture of cyclic phosphonitriles of the formula $(RR'PN)_m$ where $m$ is predominantly 3 and 4. In the formula, R and R' are members selected from the class consisting of a phenyl radical and a substituted phenyl radical of the formula

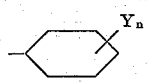

More particularly, this invention relates to an improved method for the preparation of diphenyl phosphonitriles of the formula $[(C_6H_5)_2PN]_m$. Although the synthesis of diphenyl phosphonitriles of this formula is known, the present method of preparation is characterized by simplicity, speed of reaction, extremely high yields of the trimer and tetramer, and is unusual in that the tetramer $$[(C_6H_5)_2PN]_4$$

is the predominant product.

Polymeric phosphonitriles are of increasing practical importance insofar as they appear to offer exceptional thermal and chemical stability at elevated temperatures. Although the phosphonitrilic halides have been known for a long time, the phosphorous-chlorine bond is susceptible to hydrolysis and this lack of hydrolytic stability has mitigated against their use in articles of commerce. The phosphorus-carbon bond is appreciably more resistant to hydrolysis and many skilled workers in the field have been exploring methods for replacing the chlorine atoms in phosphonitrilic chlorides with carbon-containing groups, particularly the phenyl $C_6H_5$, group and obtaining good yields. Previously, such products have been made by reactions of an appropriate Grignard reagent, such as phenyl magnesium bromide, with phosphonitrilic chlorides; or by Friedel-Crafts phenylation of the chlorides in benzene solution using aluminum chloride as a catalyst. The Grignard reactions resulted in methods which were long and tedious, which could be used only for relatively small batches, and which gave extremely low yields. Likewise, the Friedel-Crafts synthesis, using benzene and aluminum chloride, also gave low yields, and these only after reaction for 42 days. More recently, diphenyl phosphonitriles have been made by reacting diphenyl phosphorus trichloride with ammonium chloride in s-tetrachloroethane at elevated temperatures (C. G. Fitzgerald, C. P. Haber, and E. A. Lawton, United States Patent No. 2,853,517, September 23, 1958) and by the action of liquid ammonia on diphenyl phosphorus trichloride at −40° C. (C. P. Haber, D. L. Herring, and E. A. Lawton, J. Am. Chem. Soc 80, 2116 (1958)). The ammonium chloride synthesis required 12–20 hours for reaction and a multiple of treatments to obtain the desired diphenyl phosphonitriles and reported yields were low, totaling about 10% with approximately equal amounts of trimer and tetramer present. The second procedure involved condensation of ammonia on solid diphenyl phosphorus trichloride at −196° C., heating to −40° C., allowing reaction to take place, and separating out the ammonium chloride by-product by extraction of the overall product with chloroform. There resulted a residue described as a mixture of two compounds so hydrolytically unstable that accurate chemical analyses could not be made. Heating of this mixture in a vacuum system to 275° C. gave a mixture of trimeric and tetrameric diphenyl phosphonitriles.

The primary object of this invention is, therefore, to provide an improved method for the preparation of cyclic phosphonitriles of the formula $(RR'PN)_m$, where $m$ is 3 or greater, characterized by simplicity, speed of reaction and high yields.

Another object of this invention is to provide an improved method for the synthesis of cyclic diphenyl phosphonitriles of the formula $[(C_6H_5)_2PN]_m$ in which the tetramer, $[(C_6H_5)PN]_4$, is the predominant product.

These and other objects of the invention will become evident from the description which follows:

This invention is based on the reaction of diphenyl phosphorus trichloride in solution with gaseous ammonia to form a stable compound, $C_{24}H_{24}P_2N_3Cl$. This compound, obtained in yields of better than 80%, is so stable hydrolytically that the ammonium chloride by-product may be removed by simple water washing. The compound, upon heating in air for 2–4 hours at temperatures above 200° C. and preferably at 250°–300° C., is converted in approximately a 90% yield to a mixture of trimeric and tetrameric diphenyl phosphonitriles with the tetramer predominating in better than a 6:1 ratio with respect to the trimer.

The process of this invention can be used for the synthesis of a variety of phosphonitrilic compounds of the formula $(RR'PN)_m$, the specific compound formed being determined by the specific disubstituted pentavalent phosphorus trihalide, $RR'PX_3$, used. In the formula, $RR'PX_3$, X is halogen and R and R', which can be the same or different, are carbon-containing groups attached to the phosphorus atom by a carbon-phosphorus bond. The groups are restricted insofar as they contain no components which are reactive with ammonia under the conditions used for synthesis and are preferably members selected from the group consisting of a phenyl radical and a substituted phenyl radical of the formula

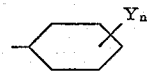

where Y is a radical selected from the class consisting of methyl, methoxy, cyano, thiocyano, isothiocyano, dialkylamino where the alkyl group is of from 1 to 4 carbon atoms, nitro and halogen and $n$ is an integer from 1–5. Examples of substituted phenyl radicals represented by R and R' are: tolyl, chlorophenyl, fluorophenyl, dinitrophenyl, dimethylaminophenyl, and cyanophenyl.

In carrying out the process of this invention, the disubstituted pentavalent phosphorus halide is dissolved in a nonreactive organic solvent which reacts neither with ammonia nor with the disubstituted pentavalent phosphorus trihalide under the conditions of the reaction. Suitable solvents for use in the practice of this invention are chloroform, anhydrous tetrachloroethane, and carbon tetrachloride.

The solution of the disubstituted pentavalent phosphorus halide is reacted with an excess of gaseous anhydrous ammonia at approximately room temperature, although temperatures in the range of from about 0°–60° C. may be used, by introducing the gaseous ammonia into a suitable reaction vessel containing the pentavalent phosphorus halide in the organic solvent, the reaction preferably being carried out under a blanket of inert gas. The solvent solution is preferably stirred throughout the reaction and the ammonia is preferably introduced through a sintered glass gas diffuser tube to insure intimate mixing of the reactants. The reaction as carried out requires 4 moles of ammonia per mole of disubstituted phosphorus halide although preferably an excess of between 4–6 moles of gaseous ammonia per mole of halide are used to insure rapid completion of the reaction. By passing the gaseous ammonia into a homogeneous solution of the disubstituted phosphorus halide, reaction occurs instantaneously.

The reaction product formed by the reaction between the anhydrous gaseous ammonia and the disubstituted pentavalent phosphorus halide is a stable compound of the empirical formula $R_2R_2'P_2N_3H_4X$ which, together with ammonium halide, is readily filtered off from the reaction medium. The ammonium halide by-product formed during the reaction and separated with the filtrate is readily washed from the stable product with cold, distilled water. A further quantity of the stable product is obtained by evaporation of the organic solvent. The reaction product is hydrolytically stable.

The stable product of the formula $R_2R_2'P_2N_3H_4X$, on heating in air for 2–4 hours at temperatures above 200° C., and preferably at a temperature in the range of 250°–300° C., gives the trimeric and the tetrameric disubstituted cyclic phosphonitriles, with the tetramer predominating. On heating to form the cyclic phosphonitriles, ammonium halide is formed as the by-product, and the mixture of cyclic phosphonitriles is readily extracted with a suitable organic solvent for the cyclic phosphonitriles leaving the ammonium halide by-product as an insoluble residue. Benzene is an example of a solvent which may be used to extract the cyclic phosphonitriles leaving ammonium halide as the insoluble residue, repeated evaporation and cooling of the benzene solution yielding the tetrameric cyclic phosphonitrile with further concentration of the benzene solution yielding the trimeric cyclic phosphonitrile. Other suitable organic solvents useful in extracting the cyclic phosphonitrile from the ammonium halide by-product are toluene, xylene, and tetrachloroethane.

The following example will serve to illustrate the invention more fully:

*Example 1*

A solution of $(C_6H_5)_2PCl_3$ (22 grams, 0.0754 mole) in 500 ml. of purified chloroform was treated at room temperature with 0.453 mole of gaseous ammonia which had been previously dried with sodium. The ammonia was introduced into the reaction vessel through a sintered glass gas diffuser tube and reacted on contact with the solution. A stream of dry nitrogen was used to blanket the reaction system, and a magnetic stirrer was used for agitating the reaction mixture. The heterogeneous solid reaction product was filtered off and washed with cold, distilled water to remove the ammonium chloride by-product and leave the desired product having the empirical formula $C_{24}H_{24}P_2N_3Cl$. A further quantity of this compound was obtained by removal of chloroform from the residual reaction solution. Both were combined, recrystallized from chloroform, and dried at 100° C. under 10 mm. Hg pressure to give 13.9 grams, representing an 82% yield, of a product having a melting point of 251°–254° C. One recrystallization from methanol gave an analytical sample, having a melting point of 245°–246.5° C. and a molecular weight of 455 based on the boiling point elevation of chloroform, calculated for $C_{24}H_{24}P_2N_3Cl$, 452. Analytical values (found in percent): C, 64.00; H, 5.46; N, 9.56; Cl, 8.32; P, 12.79. Calculated values for $C_{24}H_{24}P_2N_3Cl$: C, 63.78; H, 5.35; N, 9.30; Cl, 7.85 and P, 13.71.

3.99 grams of the compound, $C_{24}H_{24}P_2N_3Cl$, was placed in a glass tube and heated in a thermostatically-controlled oil bath at 270°–280° C. for 3 hours. The product was extracted repeatedly with benzene to leave 0.48 gram (0.00897 mole) of ammonium chloride as an insoluble residue. Repeated evaporation and cooling of the benzene solution gave 2.69 grams (76.9% yield) of tetrameric diphenyl phosphonitrile, $[(C_6H_5)_2PN]_4$, as white needles, melting at 326°–328° C. (Fisher-Johns block). One recrystallizaiton from benzene gave a sample for analysis, M.P. 319.5°–321.0° C. (capillary tube). Analytical values (found): C, 72.63; H, 5.25; N, 7.02; Cl, 0.00; P, 15.00%. The molecular weight based on the boiling point elevation of benzene, 791; calculated for $[(C_6H_5)_2PN]_4$, 797. Continued concentration of the benzene solution gave 0.43 gram (12.3% yield) of trimeric diphenyl phosphonitrile, $[(C_6H_5)_2PN]_3$. A recrystallized sample melted at 231.5°–232.5° C. (capillary tube). Analytical values (found): C, 72.15; H, 5.16; N, 7.09; P, 14.98%. Calculated values for $(C_6H_5)_2PN$: C, 72.35; H, 5.06; N, 7.03; P, 15.55%.

I claim.

1. In a method of forming a mixture of cyclic phosphonitriles of the formula $(RR'PN)_m$ where $m$ in the mixture is predominantly 3 and 4 and where R and R' are members selected from the class consisting of a phenyl and a substituted phenyl of the formula

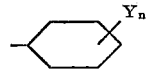

where Y is a member selected from the class consisting of methyl, methoxy, cyano, thiocyano, isothiocyano, dialkylamino where the alkyl group is of from 1–4 carbon atoms, nitro and halogen and $n$ is an integer from 1–5, the improvement which comprises reacting a disubstituted pentavalent phosphorus halide of the formula $RR'PX_3$, dissolved in a nonreactive organic solvent, with an excess of gaseous anhydrous ammonia at a temperature in the range of about 0° C. to 60° C. to form a stable compound of the formula $R_2R'_2P_2N_3H_4X$ and heating said compound to form a mixture of said cyclic phosphonitriles.

2. A method in accordance with claim 1 in which the ratio of reactants is 1 mole of said disubstituted phosphorus pentavalent halide to 4–6 moles of ammonia.

3. A method in accordance with claim 2 in which said intermediate is heated at 250°–300° C. for 2–4 hours.

4. In a method of forming cyclic diphenyl phosphonitriles of the formula $[(C_6H_5)_2PN]_m$ where $m$ is a predominantly 3 and 4, the improvement which comprises reacting a solution of a diphenyl phosphorus trihalide of the formula $(C_6H_5)_2PX_3$, where X is halogen, in a nonreactive organic solvent with an excess of gaseous anhydrous ammonia in a 1:4–6 mole ratio of diphenyl phosphorus trihalide to ammonia at a temperature in the range of about 0°–60° C. to form a stable compound of the formula $(C_6H_5)_4P_2N_3H_4X$, isolating and heating said compound to form said cyclic phosphonitriles and ammonium halide.

5. A method in accordance with claim 4 in which said intermediate is heated at 250°–300° C. for 2–4 hours after which said cyclic phosphonitriles are separated from the ammonium halide by-product by extraction with a solvent which is specific for said cyclic phosphonitriles.

6. A method in accordance with claim 4 in which said diphenyl pentavalent phosphorus halide is diphenyl phosphorus trichloride and in which the cyclic phosphonitriles formed by heating said intermediate are predominantly $[(C_6H_5)_2PN]_4$ and $[(C_6H_5)_2PN]_3$.

7. In a method of forming a mixture of cyclic diphenyl phosphonitriles where said diphenyl phosphonitriles are predominantly of the formula $[(C_6H_5)_2PN]_4$ and $[(C_6H_5)_2PN]_3$ the improvement which comprises introducing gaseous anhydrous ammonia into a solution of diphenyl phosphorus trichloride of the formula $(C_6H_5)_2PCl_3$ in chloroform at a temperature in the range of 0°–60° C., said ammonia and diphenylphosphorus trichloride being reacted in a mole ratio of about 4–6:1, respectively, to form a stable compound of the formula $(C_6H_5)_4P_2N_3H_4Cl$, isolating and heating said compound at a temperature in the range of about 250°–300° C. for about 2–4 hours and extracting the mixture of cyclic phosphonitriles thus formed from the ammonium chloride by-product with a solvent for said cyclic phosphonitriles.

8. A method of forming a mixture of cyclic phosphonitriles of the formula $(RR'PN)_m$ where $m$ is predominantly 3 and 4 comprising heating, the reaction product formed by reacting, in relative proportions, 1 mole of a disubstituted pentavalent phosphorus halide of the formula RR'PX₃ in a nonreactive organic solvent with from 4-6 moles of gaseous anhydrous ammonia at a temperature between 0° and 60° C., X being a halogen atom and R and R' being members selected from the group consisting of a phenyl and a substituted phenyl of the formula

where Y is a member selected from the class consisting of methyl, methoxy, cyano, thiocyano, isothiocyano, dialkylamino where alkyl is of from 1-4 carbon atoms, nitro and halogen, and $n$ is an integer from 1-5.

References Cited in the file of this patent
UNITED STATES PATENTS
2,853,517  Fitzgerald et al. _____ Sept. 23, 1958

OTHER REFERENCES
Haber et al. J. American Chem. Soc., volume 80, pages 2116-2117 (1958).